(12) United States Patent
Takano et al.

(10) Patent No.: US 8,932,882 B2
(45) Date of Patent: Jan. 13, 2015

(54) METHOD OF MANUFACTURING SEMICONDUCTOR DEVICE

(75) Inventors: Katsushi Takano, Tokyo (JP); Hiroaki Izumi, Tokyo (JP); Kanji Sugino, Tokyo (JP)

(73) Assignee: PS4 Luxco S.a.r.l., Luxembourg (LU)

( * ) Notice: Subject to any disclaimer, the term of this patent is extended or adjusted under 35 U.S.C. 154(b) by 123 days.

(21) Appl. No.: 13/081,675

(22) Filed: Apr. 7, 2011

(65) Prior Publication Data

US 2011/0250707 A1   Oct. 13, 2011

(30) Foreign Application Priority Data

Apr. 8, 2010 (JP) ................................. 2010-089891

(51) Int. Cl.
*H01L 21/66* (2006.01)
*G05B 19/12* (2006.01)

(52) U.S. Cl.
CPC .... *G05B 19/128* (2013.01); *G05B 2219/32055* (2013.01); *G05B 2219/32067* (2013.01); *G05B 2219/32127* (2013.01); *G05B 2219/45031* (2013.01)
USPC ...................................... 438/5; 257/E21.525

(58) Field of Classification Search
USPC ......................... 438/5, E21.525; 257/E21.525
See application file for complete search history.

(56) References Cited

U.S. PATENT DOCUMENTS

| | | | |
|---|---|---|---|
| 6,073,501 A * | 6/2000 | Rohner ........................ 73/865.8 |
| 6,507,800 B1 * | 1/2003 | Sheu ............................ 702/117 |
| 6,586,261 B1 * | 7/2003 | Ishizuka et al. ................... 438/5 |
| 6,638,778 B1 * | 10/2003 | Peterson et al. ................ 438/14 |
| 6,716,648 B2 * | 4/2004 | Iriki ................................ 438/14 |
| 2007/0078556 A1 * | 4/2007 | Stirton et al. ................. 700/108 |
| 2007/0232045 A1 * | 10/2007 | Lally et al. .................... 438/597 |
| 2008/0032428 A1 * | 2/2008 | Behm et al. ...................... 438/9 |
| 2008/0182343 A1 * | 7/2008 | Deshpande et al. .............. 438/5 |
| 2008/0318343 A1 * | 12/2008 | Vepa et al. ........................ 438/4 |
| 2009/0276077 A1 * | 11/2009 | Good et al. ................... 700/110 |
| 2010/0209830 A1 * | 8/2010 | Carcasi et al. .................. 430/30 |
| 2010/0279438 A1 * | 11/2010 | An et al. ......................... 438/14 |

FOREIGN PATENT DOCUMENTS

| | | |
|---|---|---|
| JP | 6-267809 A | 9/1994 |
| JP | 10-163097 A | 6/1998 |
| JP | 11-162842 A | 6/1999 |
| JP | 2003-257947 A | 9/2003 |
| JP | 2004-356634 A | 12/2004 |
| JP | 2006-332656 A | 12/2006 |
| JP | 2007-189265 A | 7/2007 |
| JP | 2007-251165 A | 9/2007 |

* cited by examiner

*Primary Examiner* — Charles Garber
*Assistant Examiner* — Stanetta Isaac
(74) *Attorney, Agent, or Firm* — Sughrue Mion, PLLC

(57) ABSTRACT

A method of manufacturing a semiconductor device may include, but is not limited to the following processes. A first group identifier allocated to a first group of semiconductor wafers is detected. The first group of semiconductor wafers includes a first semiconductor wafer to be processed first among the first group. A first processor of a plurality of processors, which process respective ones of the first group of semiconductor wafers, are determined based on the first group identifier. The first processor is used for processing the first semiconductor wafer. The first semiconductor wafer is supplied to the first processor.

18 Claims, 8 Drawing Sheets

|  | LOT : 001 | | | | | LOT : 002 | | | | |
|---|---|---|---|---|---|---|---|---|---|---|
| STAGE | SLOT | | | | | SLOT | | | | |
| A | 1 | 3 | ... | 23 | 25 | 1 | 3 | ... | 23 | 25 |
| B | 2 | 4 | ... | 24 | | 2 | 4 | ... | 24 | |

|  | LOT : 001 | | | | | LOT : 002 | | | | |
|---|---|---|---|---|---|---|---|---|---|---|
| STAGE | SLOT | | | | | SLOT | | | | |
| A | 1 | 3 | ... | 23 | 25 | 2 | 4 | ... | 22 | 24 |
| B | 2 | 4 | ... | 24 | 1 | 3 | 5 | ... | 23 | 25 |

METHOD OF MANUFACTURING SEMICONDUCTOR DEVICE

BACKGROUND OF THE INVENTION

1. Field of the Invention

The present invention relates to a method of manufacturing a semiconductor device.

Priority is claimed on Japanese Patent Application No. 2010-089891, filed Apr. 8, 2010, the content of which is incorporated herein by reference.

2. Description of the Related Art

Recently, with the rapid progress in miniaturization and high density of semiconductor devices, it has been becoming more difficult to ensure sufficient manufacturing margin for manufacturing processes, and extremely high processing precision has been required for a photolithography process performed by an exposure apparatus, and the like. For example, regarding errors in alignment of a photomask with a pattern formed on a semiconductor wafer, errors in position control of a mask stage and a wafer stage, have been nonnegligible.

On the other hand, a manufacturing apparatus, which includes multiple wafer processors that are independently-controllable and perform wafer processes in parallel, has been developed to enhance the throughput of the manufacturing apparatus. However, multiple wafer processors have different occurrence tendencies of control errors. For this reason, it has been necessary to specify a wafer processor for each wafer to be processed in order to ensure high processing precision.

Japanese Patent Laid-Open Publication No. H11-162842 and No. H06-267809 disclose techniques of setting processing conditions and managing processing states for each wafer with use of wafer IDs (Identifications).

According to the technique disclosed in Japanese Patent Laid-Open Publication No. H11-162842, a processing condition for a first lithography process is stored with a wafer ID. Then, a wafer ID on a wafer is read upon a second lithography process. Then, the processing condition for the first lithography process is invoked to perform the second lithography process.

Japanese Patent Laid-Open Publication No. H06-267809 discloses a multi-chamber apparatus that includes multiple process chambers, wafer loader chambers, and wafer unloader chambers. Each chamber is provided with a wafer ID reader. Thus, setting of processing conditions and management of processing states are enabled.

According to the above two techniques, however, a pattern of the wafer ID is formed on a wafer. For this reason, if a film is formed on the pattern of the wafer ID, or the shape of the pattern of the wafer ID is changed by an etching process, errors in reading the wafer ID occur in some cases. Each time a reading error occurs, operation of the wafer processing apparatus stops, thereby lowering the operation rate of the wafer processing apparatus.

When the wafer processing apparatus includes multiple wafer processors, robot arms called a wafer loader supply, from a wafer carrier housing multiple wafers, the wafers to wafer processors. It is necessary to supply wafers to all the wafer processors, to perform wafer processes in parallel and to maintain high throughput. Regarding the above techniques using the wafer ID, however, there is occasionally a wafer processor to which no wafer is supplied since no wafer is specified with respect to the wafer processor. In this case, the wafer processor does not operate, thereby lowering the operation rate of the wafer processing apparatus. Further, the wafer loader reads the wafer ID for each wafer, and determines a wafer processor to which the wafer is supplied. For this reason, the wafer loader has to operate randomly, thereby increasing wasted motions. Accordingly, it becomes difficult to perform the optimal and smooth control of the wafer loader, thereby lowering the operation rate of the wafer processing apparatus.

SUMMARY

In one embodiment, a method of manufacturing a semiconductor device may include, but is not limited to the following processes. A first group identifier allocated to a first group of semiconductor wafers is detected. The first group of semiconductor wafers includes a first semiconductor wafer to be processed first among the first group. A first processor of a plurality of processors, which process respective ones of the first group of semiconductor wafers, are determined based on the first group identifier. The first processor is used for processing the first semiconductor wafer. The first semiconductor wafer is supplied to the first processor.

In another embodiment, a method of manufacturing a semiconductor device may include, but is not limited to the following processes. A first group identifier allocated to a first group of semiconductor wafers is detected. The first group of semiconductor wafers are housed in respective ones of a first set of slots that are numbered. A plurality of processors to be used for processing respective ones of the first group of semiconductor wafers are determined based on the first group identifier. The first group of semiconductor wafers are supplied to the plurality of processors determined.

In another embodiment, a method of manufacturing a semiconductor device may include, but is not limited to the following processes. A first group identifier allocated to a first group of semiconductor wafers having been processed by a first set of processors is detected. The first group of semiconductor wafers are housed in a first set of slots that are numbered. A second set of processors to be used for processing respective ones of the first group of semiconductor wafers having been processed are determined based on the first group identifier. The first group of semiconductor wafers are supplied to the second set of processors determined.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will now be described herein with reference to illustrative embodiments. The accompanying drawings explain a wafer processing system and a method of manufacturing a semiconductor device in the embodiments. The size, the thickness, and the like of each illustrated portion might be different from those of each portion of an actual wafer processing system.

Those skilled in the art will recognize that many alternative embodiments can be accomplished using the teachings of the present invention and that the present invention is not limited to the embodiments illustrated herein for explanatory purposes.

First Embodiment

Figure 1:
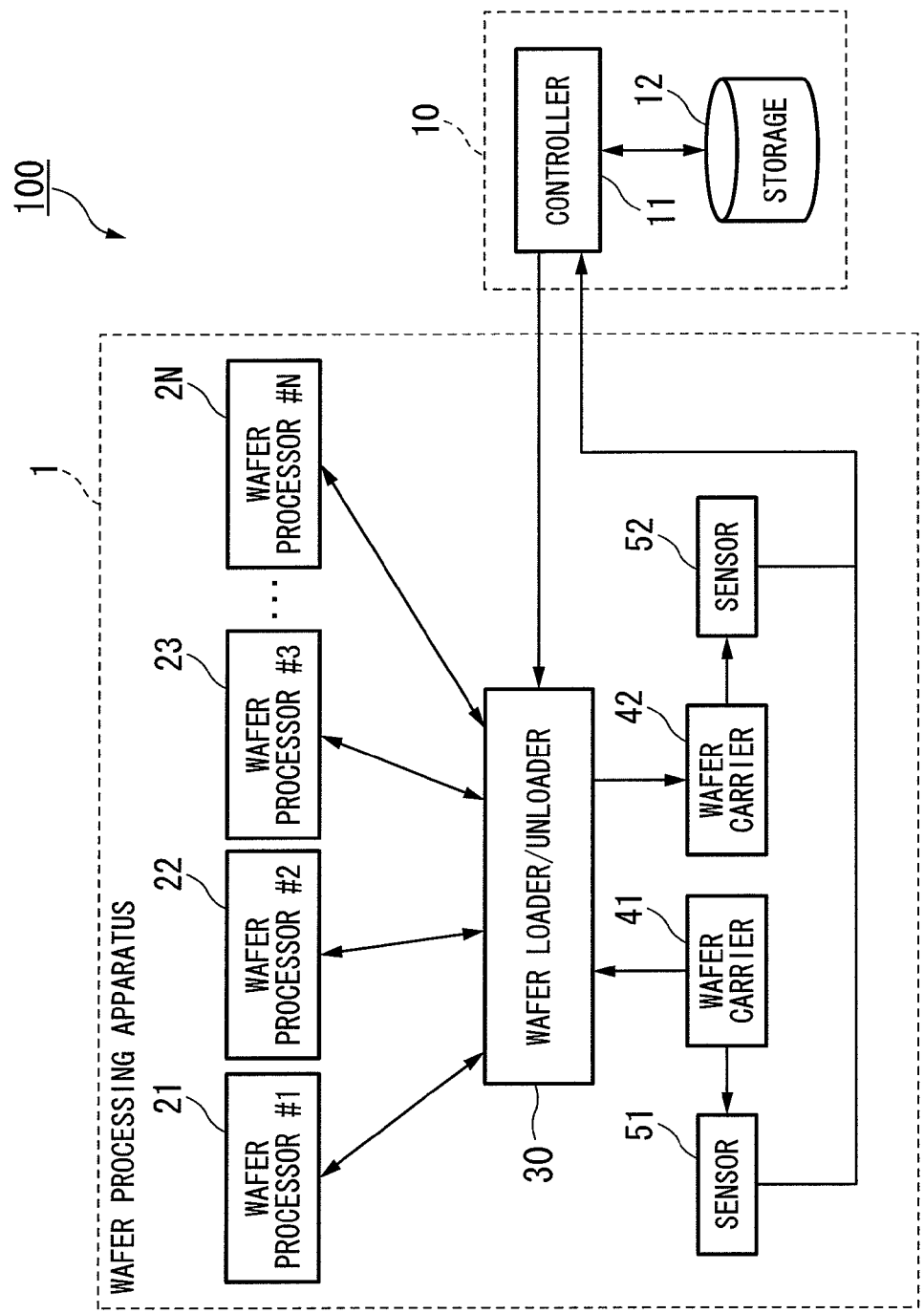
FIG. 1 is a block diagram illustrating a wafer processing system according to a first embodiment of the present invention.

Hereinafter, a method of manufacturing a semiconductor device according to a first embodiment of the present invention is explained with reference to FIGS. 1 and 2. FIG. 1 is a block diagram illustrating a wafer processing system 100 according to the first embodiment. The wafer processing system 100 includes a wafer processing apparatus 1 and a host apparatus 10. The wafer processing apparatus 1 includes: wafer processors 21 to 2N; a wafer loader/unloader 30; wafer carriers 41 and 42; and sensors 51 and 52.

The N numbers of #1 to #N are appended to the wafer processors 21 to 2N, respectively. The wafer processors 21 to 2N process semiconductor wafers (hereinafter, "wafers") in parallel. When the wafer loader/unloader 30 supplies wafers to the wafer processors 21 to 2N, the wafer processors 21 to 2N process the supplied wafers. Here, the wafer processors 21 to 2N include tools and apparatuses for performing processing, measurement, testing, and the like of wafers, such as a reaction chamber, an exposure system, and an alignment measurement system.

The wafer loader/unloader 30 is placed between a set of the wafer carriers 41 and 42 and a set of the wafer processors 21 to 2N. The wafer loader/unloader 30 transports wafers to be processed therebetween. The wafer loader/unloader 30 supplies, from the wafer carrier 41, unprocessed wafers to the wafer processors 21 to 2N. The wafer loader/unloader 30 ejects, from the wafer processors 21 to 2N, processed wafers to the wafer carrier 42. The wafer loader/unloader 30 is coupled to the host apparatus 10 through a control signal line. The host apparatus 10 controls the wafer loader/unloader 30 to perform supply and ejection of wafers.

Each of the wafer carriers 41 and 42 houses a lot including multiple wafers. The wafer carrier is placed on a wafer carrier stage (not shown). The wafer carrier 41 houses wafers to be processed by the wafer processors 21 to 2N. The wafer carrier 42 houses wafers having been processed by the wafer processors 21 to 2N.

The sensors 51 and 52 detect a lot identifier and presence or absence of a wafer in each slot of the wafer carrier. The sensors 51 and 52 are coupled to the host apparatus 10 via a signal line, and supplies detected lot information (lot identifier and information concerning presence or absence of a wafer in each slot) to the host apparatus 10.

The host apparatus 10 includes a controller 11 and a storage 12. The controller 11 controls the wafer loader/unloader 30 via a control signal line based on the lot information detected by the sensors 51 and 52. The controller 11 controls the storage 12 to store various information pieces, such as the lot information. The controller 11 refers to information pieces stored in the storage 12. The storage 12 stores various information pieces, such as control programs and lot information.

Figure 2:
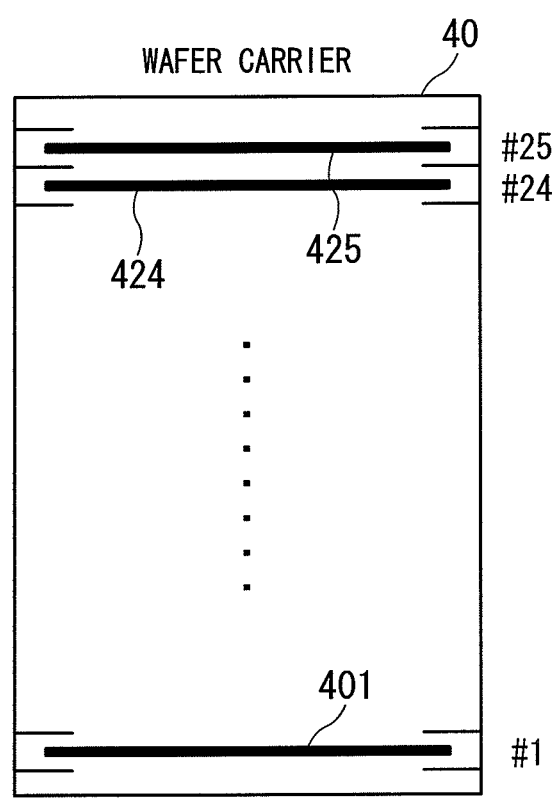
FIG. 2 illustrates a wafer carrier of the first embodiment.

FIG. 2 illustrates an example of a wafer carrier 40 of the first embodiment. The wafer carrier 40 houses a lot including 25 pieces of wafers appended the wafer numbers of #1 to #25. The wafer carrier 40 has housing spaces called "slots," in which wafers 401 to 425 are housed sequentially from the bottom slot 401. Hereinafter, the slot for housing the wafer 401 (appended the wafer number #1) is called slot SL1. Similarly, the slot for housing the wafer 425 (appended the wafer number #25) is called slot SL25.

Hereinafter, operation of the wafer processing system 100 of the first embodiment is explained with reference to FIG. 1. When the wafer carrier 41 is placed on a wafer carrier stage, the sensor 51 detects a lot identifier, and the presence or absence of a wafer in each slot. Then, the sensor 51 supplies the result of the detection to the controller 11 of the host apparatus 10.

Based on the lot identifier supplied from the sensor 51, the controller 11 obtains lot information related to the lot identifier from the storage 12. The lot information includes identification information of a wafer processor related to the lot. It is assumed here that the identification information of the wafer processor indicates the number (i.e., wafer processor identifier) of a wafer processor to be used for processing the first wafer housed in the slot SL1 of the wafer carrier 41.

Based on the identification information of the wafer processor, the controller 11 controls the wafer loader/unloader 30 to supply a wafer housed in the slot SL1 of the wafer carrier 41 to the wafer processor identified by the identification information (for example, the wafer processor 21 appended the number #1).

The order of supplying wafers from the wafer carrier 41 is predetermined, such as from the slot SL1 to the slot SL25. Additionally, the order of assigning the wafer processors 21 to 2N is predetermined. According to the predetermined order of supplying wafers and the predetermined order of assigning the wafer processors 21 to 2N, the controller 11 controls the wafer loader/unloader 30 to supply wafers following the first wafer housed in the wafer carrier 41 to respective ones of the wafer processor 21 to 2N. The order of supplying wafers to respective ones of the wafer processors 21 to 2N is, for example, the wafer processor 21 appended the number #1, the wafer processor 22 appended the number #2, . . . , the wafer processor 2N appended the number #N, the wafer processor 21 appended the number #1, . . . , and the wafer processor 2N appended the number #N.

The wafer processors 21 to 2N process the supplied wafers in parallel. Then, the controller 11 controls the wafer loader/unloader 30 to sequentially house the wafers having been processed by the wafer processors 21 to 2N in the slots of the wafer carrier 42 which have the same slot numbers as those of the slots of the wafer carrier 41 in which the wafers have been housed. Specifically, the wafer having been housed in the slot SL1 of the wafer carrier 41 is housed in the slot SL1 of the wafer carrier 42. The wafer having been housed in the slot SL2 of the wafer carrier 41 is housed in slot SL2 of the wafer carrier 42, and the like.

The sensor 52 detects wafer housing information that indicates slots of the wafer carrier 42 in which wafers are housed, and then supplied the wafer housing information to the controller 11. Based on the wafer housing information supplied from the sensor 52, the controller 11 controls the wafer loader/unloader 30 to house the processed wafers in the wafer carrier 42. If no wafer is present in a slot of the wafer carrier 41 (hereinafter, "empty slot"), the controller 11 controls the wafer loader/unloader 30 not to house a wafer in the empty slot of the wafer carrier 42 that has the same slot number as that of the empty slot of the wafer carrier 41.

It is not necessary to sequentially supply wafers to the wafer processors 21 to 2N. For example, wafers may be collectively supplied to the wafer processors 21 to 2N as long as the wafer processors to which the wafers are supplied are predetermined. In this case, the wafer processors 21 to 2N may simultaneously start operation after all the wafer processors 21 to 2N receive wafers. Alternatively, a first wafer process may start when a wafer is supplied to one of the wafer processors 21 to 2N. After a predetermined period of time, a second wafer process may start when another wafer is supplied to another one of the wafer processors 21 to 2N.

The lot information stored by the storage 12 may include information concerning process conditions for the past processes, amendment data, and the like. The controller 11 obtains the lot information from the storage 12 based on the lot identifier detected, and then performs a wafer process based on the lot information obtained. Thereby, the controller 11 can perform the optimal process for each wafer.

As explained above, the controller 11 controls the wafer loader/unloader 30 to supply wafers to the wafer processors 21 to 2N based on the identification information uniquely identifying the wafer processors 21 to 2N, which is related to the lot identifier. Thus, the controller 11 can collectively control the wafer processors 21 to 2N in units of lots without setting and detection of the ID number for each wafer. For this reason, the ID number does not have to be detected for each wafer, thereby reducing the processing time. Accordingly, the operation rate of the wafer processing apparatus 1 can be enhanced by the manufacturing method of the first embodiment.

Additionally, the identification information of the wafer processor (21 to 2N) indicates an identifier of a wafer processor to be used for processing the first wafer of a lot. The identification information is stored in the storage 12. The order of supplying wafers and the order of assigning the wafer processors 21 to 2N are predetermined. Thereby, based on the wafer process identifier stored in the storage 12, the controller 11 can has the same wafer processed by the same wafer processor among different processes performed by the same wafer process apparatus 1. Accordingly, even if different wafer processors have different properties, high processing precision can be achieved.

Further, the lot information stored by the storage 12 includes, for each wafer, process conditions for the past processes, amendment data, and the like. Thereby, the controller 11 can perform a wafer process under the same conditions as used in the past processes. Accordingly, even higher processing precision can be achieved.

Second Embodiment

Figure 3:
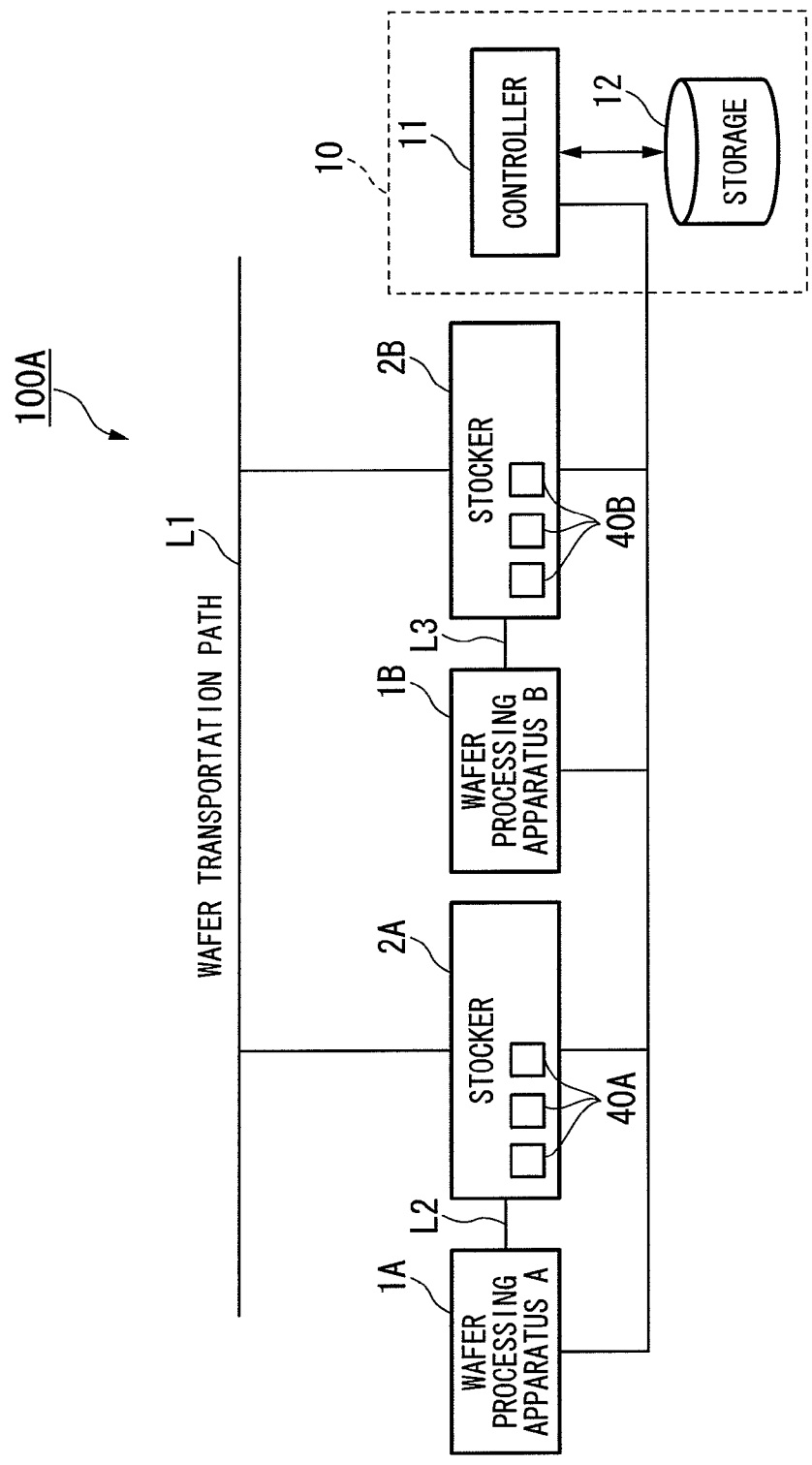
FIG. 3 is a block diagram illustrating a wafer processing system according to a second embodiment of the present invention.

FIG. 3 is a block diagram illustrating a wafer processing system 100A according to a second embodiment of the present invention. The wafer processing system 100A includes: wafer processing apparatuses 1A and 1B; stockers 2A and 2B; and the host apparatus 10. The like reference numerals denote like elements between the first and second embodiments. The wafer processing apparatuses 1A and 1B have the same structure as that of the wafer processing apparatus 1 shown in FIG. 1.

The stockers 2A and 2B are coupled to each other via a wafer transportation path L1. The stocker 2A (2B) stores multiple wafer carriers 40A (40B) waiting in a queue according to the processing order. The stocker 2A (2B) is coupled to the wafer processing apparatus 1A (1B) via a wafer transportation path L2 (L3). The stocker 2A (2B) supplies a lot to be processed to the wafer processing apparatus 1A (1B) via the wafer transportation path L2 (L3).

The wafer carriers 40A and 40B have the same structure as that of the wafer carrier 40 shown in FIG. 2. Each of the wafer carriers 40A and 40B houses multiple wafers. The wafer carriers 40A (40B) is housed in a dust-tight case called a hoop, is transferred to the wafer processing apparatus 1A (1B), and then is stored in the stocker 2A (or 2B) corresponding to the wafer processing apparatus 1A (1B). An IC (Integrated Circuit) tag is attached onto the wafer carrier 40A (40B) or the hoop. The IC tag previously stores, in a storage area thereof, lot identification information including a lot identifier, such as the lot number. Upon detecting a reference request from a sensor, the IC tag outputs the stored information.

The controller 11 is coupled to the wafer processing apparatuses 1A and 1B, and stockers 2A and 2B via control signal lines. The controller 11 controls supply and ejection of a lot, and a wafer process.

Figure 4:
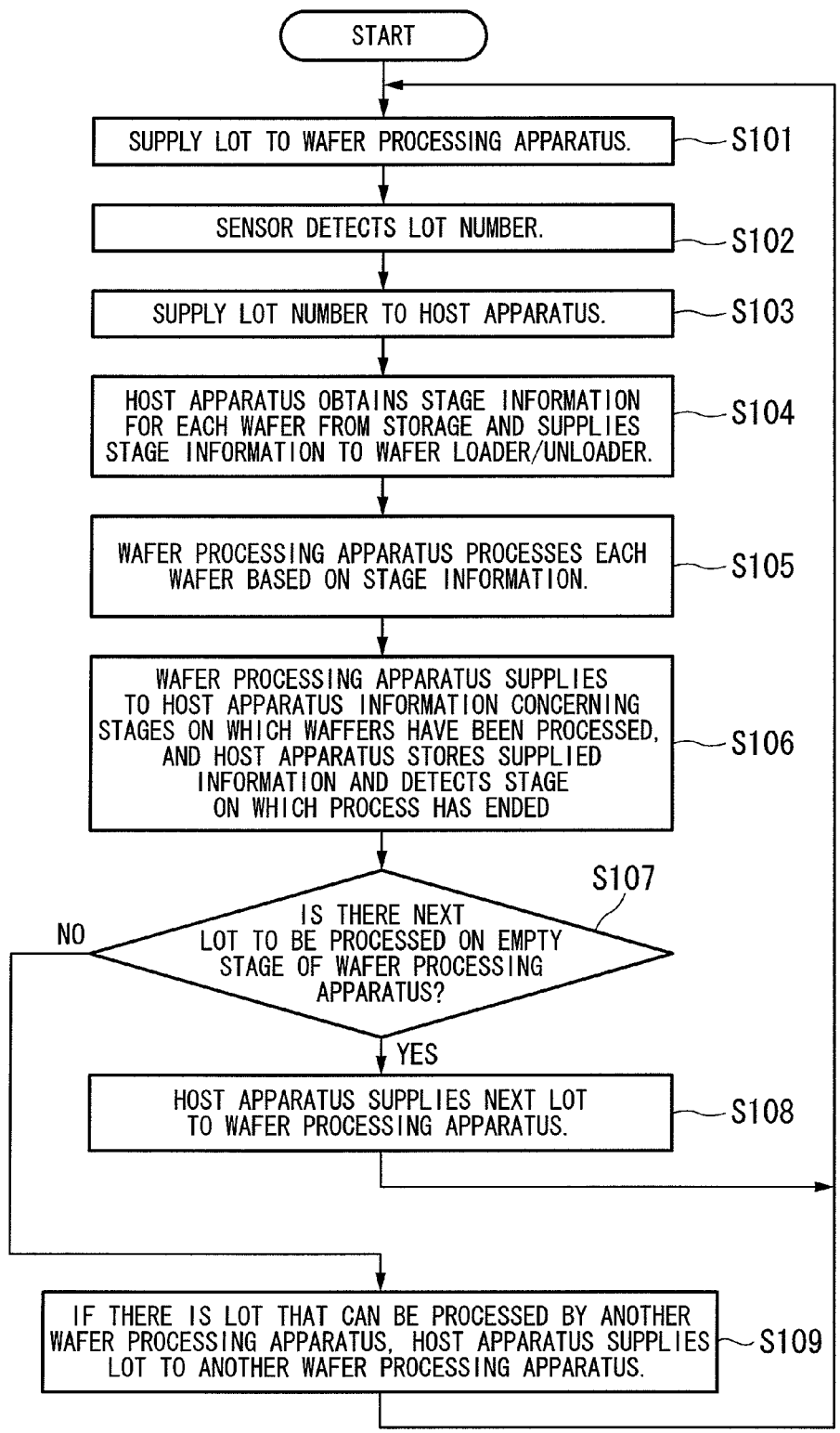
FIG. 4 is a flowchart illustrating operation of the wafer processing system of the second embodiment.

Hereinafter, operation of the wafer processing system 100A of the second embodiment is explained with FIG. 4. FIG. 4 is a flowchart illustrating operation of the wafer processing system 100A of the second embodiment. A case where the wafer processing apparatus 1A performs a wafer process is explained here. It is assumed here that a pre-process of the wafer process has been performed by the wafer processing apparatus 1B.

In step S101, the controller 11 supplies a lot (i.e., the wafer carrier 40A) from the stocker 2A to the wafer processing apparatus 1A via the wafer transportation path L2. In step S102, the sensor 51 (shown in FIG. 1) of the wafer processing apparatus 1A detects, from the IC tag, lot identification information including the lot number and the like. In step S103, the sensor 51 supplies the lot identification information detected to the controller 11 of the host apparatus 10.

In step S104, the controller 11 obtains, from the storage 12, stage information for each wafer included in the lot. In storage 12, the stage information is related to the lot identification information detected by the sensor 51. The stage information includes identification information pieces of the wafer processors of the wafer processing apparatus 1A. The stage information includes, for example, a relation between the slot number of a slot housing a wafer and the wafer processor number (i.e., wafer processor identifier) of a wafer processor of the wafer processing apparatus 1A to be used for processing the wafer. Based on the stage information obtained, the controller 11 controls the wafer loader/unloader 30 (shown in FIG. 1) to supply wafers to the respective ones of the wafer processors.

In step S105, the controller 11 controls the wafer processing apparatus 1A to process the supplied wafers based on the stage information obtained. In step S106, the wafer processing apparatus 1A supplies, to the controller 11 of the host apparatus 10, stage information concerning the stages on which the respective wafers have been processed. The controller 11 controls the storage 12 to store the stage information supplied and the lot identification information while the lot identification information is related to the stage information. Based on the stage information supplied from the wafer processing apparatus 1A, the controller 11 detects which wafer processor (stage) has finished the wafer process (i.e., detects an empty stage). The lot having been subjected to the wafer process is transported to the stocker 2A via the wafer transportation path L2. If the lot transported to the stocker 2A is used by the wafer processing apparatus 1B in the next wafer process, the lot is transported to the stocker 2B via the wafer transportation path L1.

In step S107, the controller 11 determines whether or not a lot to be processed next on an empty stage of the wafer processing apparatus 1A is included in the stocker 2A. If the controller 11 determines that the next lot is included in the stocker 2A, the routine proceeds to step S108. In step S108, the controller 11 supplies the next lot in the stocker 2A to the wafer processing apparatus 1A via the wafer transportation path L2, and then the routine returns to step S101.

On the other hand, if the controller 11 determines in step S107 that the next lot is not included in the stocker 2A, the routine proceeds to step S109. In step S109, if the next lot to be processed on the empty stage of the wafer processing apparatus 1A is included in another stocker, the controller 11 transports the next lot in another stocker to the stocker 2A via the wafer transportation path L1. Specifically, it is assumed here that the slot to be processed next on the empty stage of the wafer processing apparatus 1A is included in the stocker 2B corresponding to the wafer processing apparatus 1B. In this case, the controller 11 controls the wafer processing apparatus 1B to preferentially process the next lot that is included in the stocker 2B and is to be processed on the empty stage of the wafer processing apparatus 1A. Thus, the controller 11 accelerates the wafer process of the next lot by the wafer processing apparatus 1B and supply of the lot processed by the wafer processing apparatus 1B to the stocker 2A via the wafer transportation path L1. Then, the controller 11 supplies the next lot from the stocker 2A to the wafer processing apparatus 1A via the wafer transportation path L2, and then the routine proceeds to step S101.

As explained above, the controller 11 obtains, from the storage 12, stage information for each wafer, which is related to the lot identification information detected by the sensor 51. Based on the stage information obtained, the controller 11 controls the wafer loader/unloader 30 (shown in FIG. 1) to supply wafers to the respective wafer processors. Thus, the controller 11 can collectively control the wafer processors in units of lots without setting and detection of the ID number for each wafer. Accordingly, it is not necessary to detect the ID number for each wafer, thereby reducing the processing time. Therefore, an operation rate of the wafer processing apparatuses 1A and 1B can be enhanced by the manufacturing method of the second embodiment.

Additionally, the stage information includes, for each wafer, history information concerning a relation between the slot number of a slot housing a wafer and the number (i.e., identifier) of the wafer processor that has processed the wafer in the past. The controller 11 obtains the stage information for each wafer from the storage 12, and can control the same wafer processor to process the same wafer in different wafer processes performed by the same wafer processing apparatus 1A (or 1B). For this reason, even if different wafer processors have different properties, high processing precision can be achieved by the manufacturing method of the second embodiment. Additionally, each wafer is processed based on the stage information for each wafer. Accordingly, the manufacturing method of the second embodiment is applicable to a case where an empty slot is present in a wafer carrier or a case where a lot is divided.

Moreover, the controller 11 assigns the next lot based on the number (i.e., identifier) of the wafer processor that has processed the last wafer in the previous lot. Additionally, the controller 11 determines whether or not the next lot to be processed on an empty stage of the wafer processing apparatus 1A is included in the stocker 2A. If the controller 11 determines that the next lot is not included in the stocker 2A, the controller 11 controls the wafer processing apparatus 1B to accelerate a wafer process of a lot corresponding to the next lot to be processed on the empty stage of the wafer processing apparatus 1A. Thus, supply of the next lot to the stocker 2A is accelerated, thereby reducing a waiting time for the wafer process by the wafer processing apparatus 1A (or 1B). Accordingly, the operation rate of the wafer processing apparatus 1A (or 1B) is further enhanced by the manufacturing method of the second embodiment.

Third Embodiment

Figure 5:
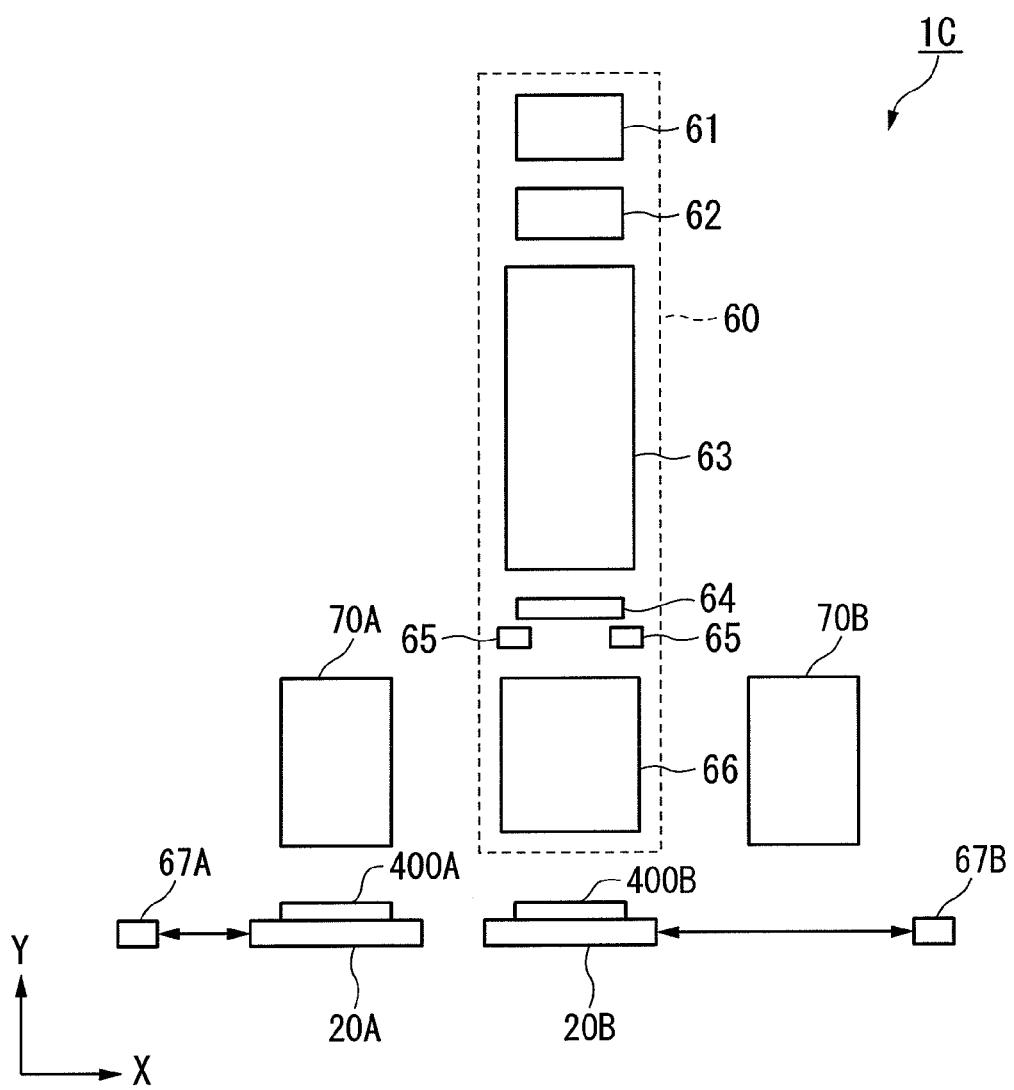
FIG. 5 illustrates a structure of an exposure apparatus according to a third embodiment of the present invention.
Figure 6:
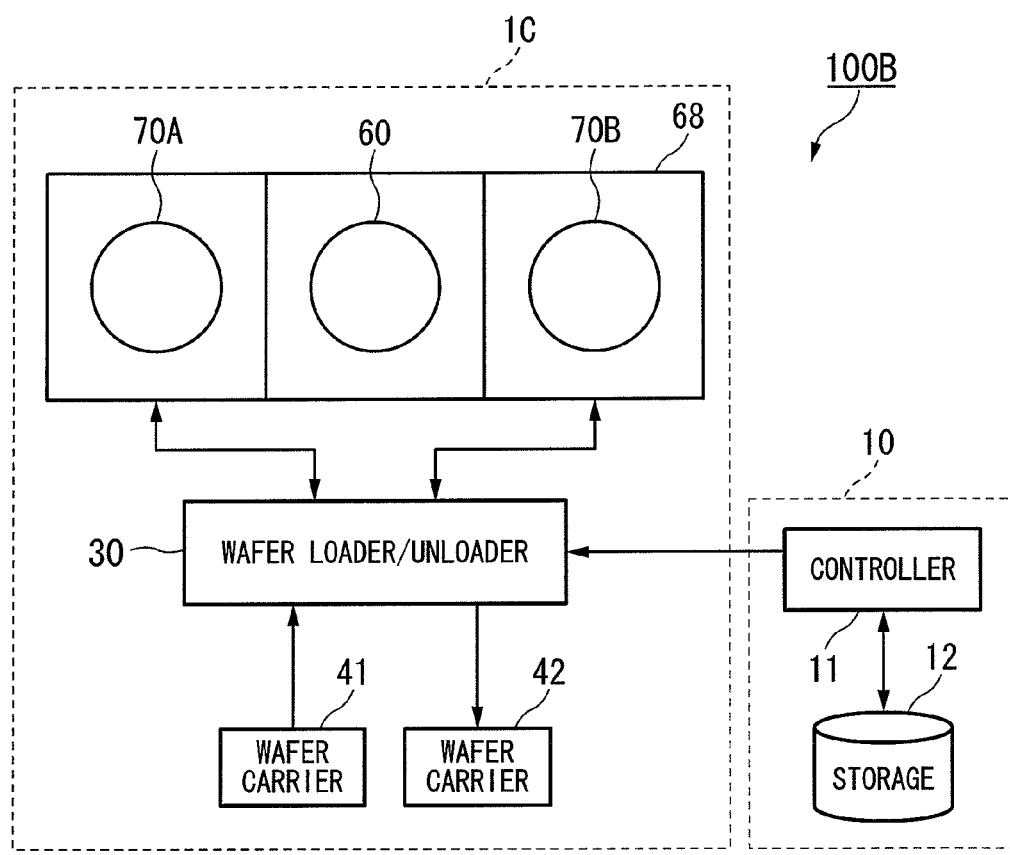
FIG. 6 is a block diagram illustrating the exposure apparatus of the third embodiment.

FIG. 5 illustrates an exposure apparatus 1C that is a wafer processing apparatus according to a third embodiment of the present invention. FIG. 6 is a block diagram illustrating a wafer processing system 100B according to the third embodiment, which includes the exposure apparatus 1C.

The exposure apparatus 1C shown in FIG. 5 includes: an exposure processor 68; the wafer loader/unloader 30; and wafer carriers 41 and 42. The wafer processing system 100B shown in FIG. 6 includes the exposure apparatus 1C and the host apparatus 10. Like reference numerals denote like elements between the first and third embodiments.

The exposure processor 68 includes: an exposure unit 60; interferometers 67A and 67B; alignment units 70A and 70B; and wafer stages 20A and 20B. The exposure unit 60 includes: an irradiation source 61; an adjuster 62; an irradiation system 63; a mask 64; a mask table 65; and a projection system 66. The exposure unit 60 exposes, with the mask 64, a wafer surface on which a photosensitive material is applied. Thus, a pattern is formed on the wafer surface.

The irradiation source 61 irradiates a laser, such as a KrF (krypton fluoride) excimer laser, which is a light source. The adjuster 62 is placed between the irradiation source 61 and the irradiation system 63. The adjuster 62 dims the laser irradiated by the irradiation source 61 using a dimming board, an aperture stop, or the like. Then, the adjuster 62 adjusts the beam diameter of the dimmed laser to an adequate value so that the laser enters the projection system 63.

The projection system 63 is placed between the adjuster 62 and the mask 64. The projection system 63 converts the laser received from the adjuster 62 into a uniform illumination light, and thus lights the mask 64. The mask 64 has a pattern on a lower surface thereof, and is used to project the pattern onto a wafer. The mask 64 is placed on the mask table 65. The mask 64 is placed between the irradiation system 63 and the projection system 66. The mask 64 is irradiated with the illumination light by the irradiation system 63.

The mask table 65 is used for placing the mask 64 thereon. The mask table 65 is movable in the two-dimensional direction (X-Y direction). The projection system 66 is placed under the mask 64. The projection system 66 projects, onto a wafer, a pattern image formed by the irradiation system 63 irradiating the mask 64.

A wafer stage 20A (20B) is used for placing a wafer 400A (400B) thereon. The wafer stage 20A (20B) moves independently in the two-dimensional direction (X-Y direction). A reference mark board, on which various reference marks are formed, is provided on an upper surface of the wafer stage 20A (20B) such that the top level of the reference marks is substantially equal to the top level of the wafer 400A. The reference mark board is used for detecting, for example, the reference position of the wafer stage 20A.

The wafer stage 20A has at least two mirror reflecting surfaces (the left side surface and the upper surface in the case of FIG. 5). The wafer stage 20B has at least two mirror reflecting surfaces (the right side surface and the upper surface in the case of FIG. 5).

The interferometer 67A (67B) receives a reflected light of an interferometer beam projected on the reflecting surface of the wafer stage 20A (20B). Then, the interferometer 67A (67B) measures the displacement from the reference position of the reflecting surface of the wafer stage 20A (20B). Thus, the interferometer 67A (67B) measures the two-dimensional position of the wafer stage 20A (20B).

The alignment unit 70A (70B) is used for measuring a position of the alignment mark on the wafer 400A (400B) placed on the wafer stage 20A (20B) and a position of the reference mark on the reference mark board. Information obtained from each alignment sensor included in each alignment unit (70A and 70B) is subjected to analog-to-digital conversion. Then, the digital wave signal is subjected to a calculation process to detect a position of the reference mark. According to the result of the detection, an instruction on synchronization position alignment and the like upon an exposure process is given to the wafer stage 20A and 20B.

The wafer loader/unloader 30 supplies unprocessed wafers from the wafer carrier 41 to the wafer stages 20A and 20B. The wafer stages 20A and 20B correspond to the wafer processors of the first embodiment. The wafer loader/unloader 30 ejects processed wafers from the wafer stages 20A and 20B to the wafer carrier 42. Supply and ejection of wafers by the wafer loader/unloader 30 are controlled by the host apparatus 10.

The supply and ejection of wafers from and to the wafer carriers 41 and 42 (which are lots) are performed by the stockers shown in FIG. 3. A lot is transferred to another processing apparatus via the wafer transportation path L1.

Hereinafter, operation of the wafer processing system 100B of the third embodiment is explained with reference to FIGS. 5 and 6. The wafer loader/unloader 30 of the exposure apparatus 1C supplies, from the wafer carrier 41, a wafer to one of the wafer stages 20A and 20B. The wafer carrier 41 houses a lot including wafers which have not been subjected to an exposure process. A case where a wafer is supplied to the wafer stage 20A is explained here. The wafer supplied to the wafer stage 20A is assumed to be a wafer 400A.

The wafer 400A is placed on the wafer stage 20A. Then, the wafer stage 20A moves to a position under the alignment unit 70A. Then, the alignment unit 70A detects the position of the alignment mark on the wafer 400A and the position of the reference mark on the reference mark board.

Then, the wafer stage 20A moves to a position under the exposure unit 60. Then, the exposure unit 60 measures displacement between the position of the alignment mark on the mask 64 and the position of the reference mark or the wafer 400A. The position of the reference mark or the wafer 400A can be observed via the projection system 66. Based on the result of the measurement and the information concerning the positions of the reference marks detected by the alignment unit 70A, the wafer stage 20A places the wafer 400A to a position which has been subjected to the synchronization position alignment at the time of the exposure process. Thus, the position of the pattern formed on a shot region of the wafer 400A in the pre-process is precisely adjusted to the position of the pattern on the mask 64.

Then, the exposure unit 60 performs an exposure process on the wafer 400A. While the exposure unit 60 performs the exposure process on the wafer 400A, the wafer loader/unloader 30 supplies a wafer to the wafer stage 20B. Here, the wafer supplied to the wafer stage 20B is assumed to be a wafer 400B. The wafer 400B is placed on the wafer stage 20B.

Then, the wafer stage 20B moves to a position under the alignment unit 70B. The alignment unit 70B detects a position of the alignment mark on the wafer 400B and a position of the reference mark on the reference mark board.

In the exposure process with respect to the wafer 400A, the irradiation source 61 irradiates a laser. The irradiated laser passes through the adjustor 62 and the irradiation system 63, and becomes a uniform irradiation light. Then, the uniform irradiation light irradiates the mask 64. A pattern image formed by the mask 64 being irradiated is projected onto the wafer 400A through the projection system 66. Thus, a predetermined pattern is formed on the wafer 400A. Then, the wafer loader/unloader 30 houses the wafer 400A having been subjected to the exposure process in the wafer carrier 42 for housing processed wafers.

Then, the wafer stage 20B moves to a position under the exposure unit 60. The exposure unit 60 measures displacement between the alignment mark on the mask 64, and the reference mark or the wafer 400B. The reference mark or the wafer 400B can be observed via the projection system 66. Based on the result of the measurement and information concerning the positions of the reference marks detected by the alignment unit 70B, the wafer stage 20B places the wafer 400B to the position having been subjected to the synchronization position alignment at the time of the exposure process. Thus, the position of the pattern formed in a shot region of the wafer 400B in the pre-process is precisely adjusted to the position of the pattern on the mask 64. Then, the exposure unit 60 performs an exposure process on the wafer 400B.

The exposure unit 60 performs the exposure process on the wafer 400B in a similar manner to the exposure process having been performed on the wafer 400A. While the exposure unit 60 performs the exposure process on the wafer 400B, the wafer loader/unloader 30 supplies a wafer to the wafer stage 20A. Then, the alignment unit 70A detects position information of various reference marks. Thus, the exposure apparatus 1C alternately performs detection of position information of the wafer stage 20A and detection of position information of the wafer stage 20B.

Figure 7:
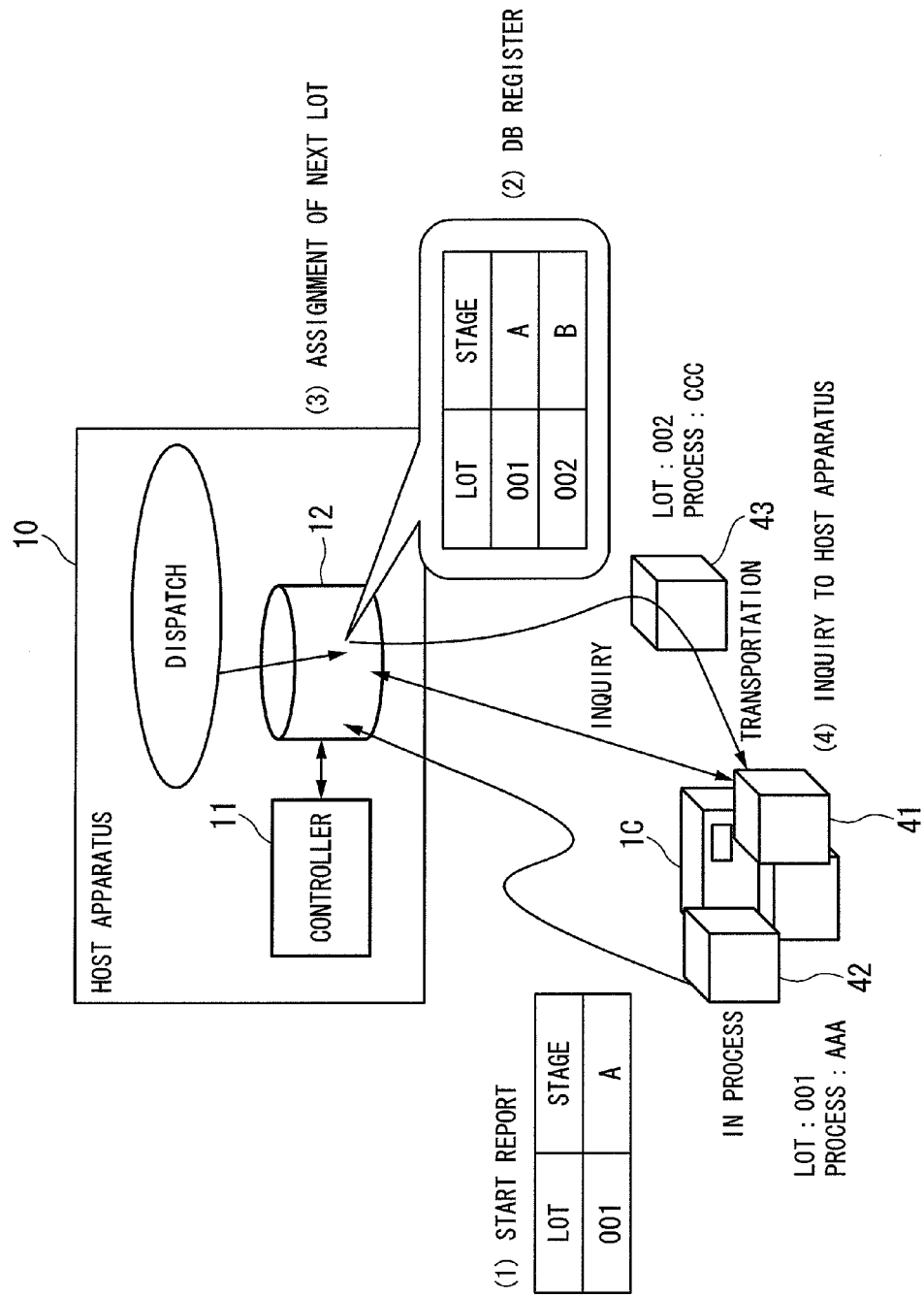
FIG. 7 illustrates operation of a wafer processing system of the third embodiment.

Hereinafter, the operation of the wafer processing system 100B is specifically explained with reference to FIG. 7. FIG. 7 illustrates operation of the wafer processing system of the third embodiment. In a start report process (1), when the wafer carrier (i.e., a lot) 41 is supplied to the exposure apparatus 1C, a sensor (not shown) detects, from an IC tag, lot identification information including the lot number. Here, the lot number is assumed to be "001." The exposure apparatus 1C supplies the detected lot identification information to the controller 11 of the host apparatus 10.

The controller 11 refers to a database (hereinafter, "DB"), and determines whether or not there is stage information (wafer processor identification information) of a stage on which the wafers corresponding to the lot number "001" have been processed in the past process. A case where the controller 11 determines that there is no stage information of a stage on which the wafers corresponding to the lot number "001" have been processed in the past process is explained here.

If the controller 11 determines that there is no stage information of a stage on which wafers corresponding to the lot number "001" have been processed in the past process, the controller 11 controls the wafer loader/unloader 30 to supply a wafer housed in the slot SL1 of the wafer carrier 41 to an empty wafer stage (the wafer stage 20A in this case). Then, the alignment unit 70A detects position information of various reference marks on the supplied wafer. Based on the detected position information of the reference marks, the exposure unit 60 performs an exposure process on the wafer placed on the wafer stage 20A. Hereinafter, the exposure process with respect to the lot number "001" is referred to as a process "AAA."

Then, in the order from the slot SL2 to the slot SL25, the wafer loader/unloader 30 sequentially supplies wafers alternately to the wafer stage 20B and the wafer stage 20A. Thus, the exposure process is performed.

In a DB register process (2), if the controller 11 determines that there is no stage information of a stage on which the wafers corresponding to the lot number "001" have been processed in the past process, the controller 11 controls the storage 12 to store the lot number "001" while the lot number "001" is related to the stage information of the wafer stage on which the wafer housed in the slot SL1 of the wafer carrier 41 has been processed. It is assumed here that the lot number "001" is stored in the DB of the storage 12 while being related to the stage information "A" indicating that the wafer housed in the slot SL1 has been processed on the wafer stage 20A.

In a slot assignment process (3), the controller 11 assigns a lot to be processed next (hereinafter, "next lot") while the exposure process is performed on the lot having the lot number "001." A lot, which includes in the slot SL1 a wafer to be processed on the wafer stage 20B, is preferentially assigned to the next lot. Here, the lot number of this lot is referred to as "002." The controller 11 refers to the DB of the storage 12, detects that the lot assigned the lot number "002" has been already processed by the wafer stage 20B in the past process "BBB," and then determines the lot assigned the lot number "002" as the next lot.

When the exposure process on the lot assigned the lot number "001" ends, the next lot (assigned the lot number "002") is supplied from the stocker. The wafers of the lot assigned the lot number "001," which has been subjected to the exposure process, is stored in the wafer carrier 42 in the same order as before the exposure process. For example, the wafer having been housed in the slot SL1 of the wafer carrier 41 is stored in the slot SL1 of the wafer carrier 42. Then, the wafer carrier 42 is transported to a stocker of the wafer processing apparatus that performs the next exposure process.

In a query process (4), when the wafer carrier 43 (i.e., the next lot assigned the lot number "002") is supplied to the exposure apparatus 1C, a sensor (not shown) detects, from an IC tag, lot identification information including the lot number. The exposure apparatus 1C supplies the lot identification information detected (the lot number "002" in this case) to the controller 11 of the host apparatus 10.

The controller 11 refers to the DB of the storage 12, and determines whether or not there is stage information (wafer processor identification information) of a wafer stage on which the lot assigned the lot number "002" has been processed in the past process. Since there is the stage information ("B") of the wafer stage on which the lot assigned the lot number "002" has been processed in the past process, the controller 11 supplies, to the wafer stage 20B, a wafer housed in the slot SL1 of the wafer carrier 43 assigned the lot number "002," based on the stage information ("B"). Then, the alignment unit 70B detects position information of various reference marks on the supplied wafer. Then, the exposure unit 60 performs an exposure process on the wafer on the wafer stage 20B based on the position information of the various reference marks detected by the alignment unit 70B. Here, the exposure process on the lot assigned the lot number "002" is referred to as a process "CCC."

Then, in the order from the slot SL2 to the slot SL25 of the wafer carrier 43, the wafer loader/unloader 30 sequentially supplies wafers alternately to the wafer stage 20A and the wafer stage 20B. Thus, the exposure process is performed.

Figures 8, 9A, 9B:
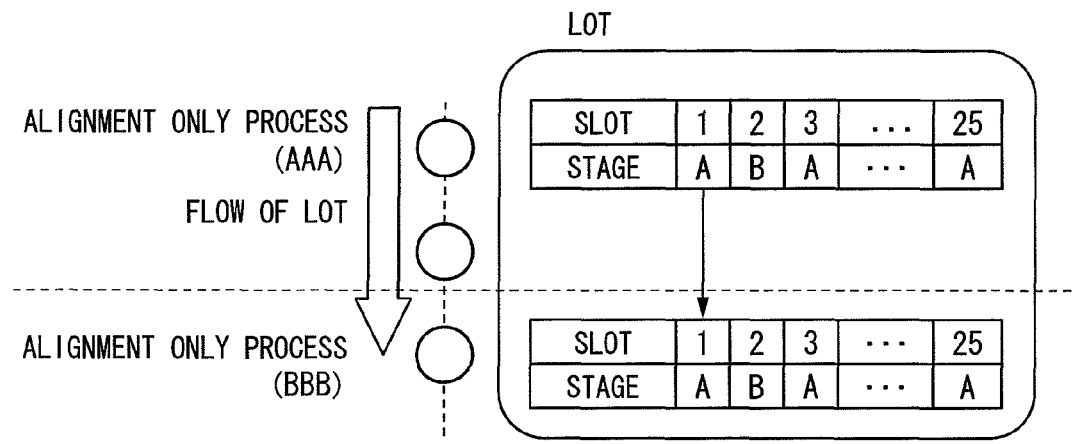
FIG. 8 illustrates an example of a wafer process of the third embodiment.
FIGS. 9A and 9B illustrate examples of a wafer process of the third embodiment.

FIG. 8 illustrates an example of the wafer process of the third embodiment. It is assumed here that the exposure process shown in FIG. 1 is repeated, and thus the exposure processes "AAA" and "BBB" are performed. The exposure processes "AAA" and "BBB" are alignment only processes. In the process "AAA," wafers housed in the odd-numbered slots of a lot are processed on the wafer stage 20A. Wafers housed in the even-numbered slots of the lot are processed on the wafer stage 20B. In the process "BBB," which is the alignment only process using the same exposure apparatus, the same stages as used in the process "AAA" are used. Thus, displacement between stages can be reduced.

The DB of the storage 12 may store lot information, process history information of each wafer, or the like, in addition to the lot number and the stage information related to the slot SL1. The process history information includes, for example, information concerning when, by which exposure apparatus, on which stage, under what conditions the process has been performed. The controller 11 can use the process history information related to the lot stored in the DB as prior information for determining alignment conditions in the query process (4).

For example, when the exposure state is predictable, such as when a shot magnification increases during the exposure process with respect to a lot, the exposure state is reflected on alignment conditions based on the process history information stored in the DB of the storage 12. There are individual differences among exposure apparatuses, i.e., each exposure apparatus has unique property. Therefore, for example, a deviation of the orthogonality degree is predicted, and then may be reflected on alignment conditions. Alternatively, with use of information concerning an exposure date, an alignment value is calculated based on a variation of the exposure state due to a variation of atmosphere pressure for each day. Thus, the alignment process may be performed.

FIGS. 9A and 9B illustrate examples of the wafer process of the third embodiment. FIG. 9A illustrates a case where the next lot assignment process (3) shown in FIG. 7 is performed without consideration of the wafer stage on which the last wafer of a lot is processed. Stage information of the stage on which the lot assigned the lot number "001" has been processed in the past process is "A". In this case, the wafer in the slot SL1 is processed on the wafer stage 20A. The wafer in the slot SL25 is also processed on the wafer stage 20A. Additionally, stage information of the stage on which the next lot assigned the lot number "002" has been processed in the past process is "A." For this reason, when the exposure apparatus 1C sequentially performs the exposure process on the lot assigned the lot number "002" after the exposure process on the lot assigned the lot number "001" ends, a waiting period occurs until the exposure process on the wafer in the slot SL 25 of the lot assigned the lot number "001" ends.

For this reason, in the next lot assignment process (3) shown in FIG. 7, the controller 11 preferentially assigns, as the next lot, a lot in which a wafer to be processed by the wafer stage 20B is housed in the slot SL1. FIG. 9B illustrates this situation.

In the case of FIG. 9B, stage information of the stage on which the lot assigned the lot number "001" has been processed in the past process is "A." For this reason, the wafer in the slot SL1 is processed on the wafer stage 20A. The wafer in the slot SL25 is also processed on the wafer stage 20A. Additionally, stage information of the stage on which the lot assigned the lot number "002" has been processed in the past process is "B." For this reason, when the exposure apparatus 1C sequentially processes the next lot assigned the lot number "002," the process on the lot assigned the lot number "002"

can be started while the wafer in the slot SL 25 of the lot assigned the lot number "001" is processed. In other words, a wafer in the slot SL1 of the lot assigned the lot number "002" is supplied to the wafer stage 20B while the wafer in the slot SL 25 of the lot assigned the lot number "001" is under the exposure process. Then, the alignment unit 70B detects position information of various reference marks. Accordingly, the waiting time between lots can be reduced.

At the time of supplying a lot, the number of lots in which a wafer to be processed by the wafer stage 20A is housed in the slot SL1 and the number of lots in which a wafer to be processed by the wafer stage 20B is housed in the slot SL1 may be equalized. Accordingly, a possibility of reducing the waiting time between lots can be increased.

As explained above, based on the lot identification information detected by the sensor, the controller 11 obtains, from the DB of the storage 12, the stage information of a stage on which the wafer housed in the slot SL1 of the lot identified by the lot identification information is to be processed. Based on the stage information obtained, the controller 11 controls the wafer loader/unloader 30 (shown in FIG. 6) to supply wafers to respective wafer stages. Thus, the controller 11 can collectively control, in units of lots, wafer stages to which wafers are supplied, without setting and detection of the ID number for each wafer. Accordingly, it is not necessary to detect the ID number for each wafer, thereby reducing a processing time and enhancing the operation rate of the exposure apparatus 1C.

The stage information includes identification information of the wafer stage on which each wafer has been processed in the past process (such as the wafer stage number or the like). The controller 11 obtains stage information stored in the DB of the storage 12, and thereby controls the same wafer to be processed on the same wafer stage in different processes performed by the same exposure apparatus 1C. For this reason, even if different wafer stages have different properties, high processing precision can be achieved.

The controller 11 assigns the next lot based on identification information (such as the wafer stage number) of a wafer stage on which the last wafer (housed in the slot SL25) of the currently-processed lot is processed, thereby reducing a waiting time among lots. Consequently, an operation rate of the wafer processing apparatus (exposure apparatus 1C) can be further enhanced.

According to the method of manufacturing a semiconductor device of the above embodiments using the wafer processing systems 100, 100A, and 100B, lot identifiers (lot number) and wafer processor identifiers (wafer processor numbers) are related and stored in the storage 12. Each of the lots houses wafers to be processed in a predetermined order. The wafer processor identifier identifies a wafer processor that processes the first wafer (housed in the slot SL1) to be processed first among the first lot. The method includes: a first process of the wafer loader/unloader 30 supplying the first wafer to the wafer processor identified by the wafer processor identifier; and a second process of the wafer loader/unloader 30 sequentially supplying the following wafers to respective ones of the wafer processors in the predetermined order.

Accordingly, the wafer processing system (100, 100A, and 100B) can collectively control, in units of lots, the wafer processors to which wafers are supplied, without setting and detection of the ID number for each wafer. Thereby, an operation rate of the wafer processing apparatus (1, 1A, 1B, and 1C) can be enhanced.

Additionally, the wafer processing system (100, 100A, and 100B) obtains a wafer processor identifier (wafer processor number) related to the lot identifier, which is stored in the storage 12. Then, the wafer processing system controls the same wafer to be processed by the same wafer processor in different processes performed by the same wafer processing apparatus (1, 1A, 1B, or 1C). Accordingly, even if different wafer processors have different properties, high processing precision can be achieved.

Further, the methods of the above embodiments includes, after the last wafer (housed in the slot SL25) of a lot is supplied to a wafer processor according to the predetermined supplying order, a process of assigning, as a lot to be processed next, a lot housing a first wafer housed in the slot SL1 related to the wafer processor identifier (wafer processing number) of the wafer processor that performs the next wafer process. Accordingly, an operation rate of the wafer processor apparatus (1, 1A, 1B, and 1C) can be further enhanced by the methods of the above embodiments.

Moreover, the wafer processor identifiers (wafer processor numbers) related to the lots are predetermined before the lots are processed by the wafer processing system (100, 100A, and 100B), thereby further enhancing the operation rate of the wafer processing apparatus (1, 1A, 1B, and 1C).

Additionally, according to the methods of the above embodiments, if an empty slot, in which no wafer is housed, is present in the wafer carrier 41, the loader/unloader 30 does not supply a wafer to a wafer processor related to the empty slot of the wafer carrier 41. Accordingly, the methods of the above embodiments are applicable to the case where a lot has an empty slot.

Moreover, the wafer processing system 100A of the second embodiment includes multiple wafer processing apparatuses (1A and 1B), each of which includes multiple processors. The lot assignment process includes, when it is determined that there is no lot related to the wafer processor identifier (wafer processor number) of a wafer processor that performs the next wafer process in the stocker (for example, 2A) housing multiple lots waiting for wafer processes, a process of assigning, as a lot to be processed next, a lot stored in the other stocker (for example, 2B), the lot related to the wafer processor identifier (wafer processor number) of a wafer processor included in another wafer processing apparatus (for example, 1B) which has performed the pre-process of the wafer process. Accordingly, the operation rate of the wafer processing apparatus (1, 1A, 1B, and 1C) can be further enhanced by the method of the first embodiment.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

It is apparent that the present invention is not limited to the above embodiments, and may be modified and changed without departing from the scope and spirit of the invention.

For example, in the first embodiment, if the same tool or device is included in each wafer processors (21 to 2N), part of the tool or device may be shared by those wafer processors (21 to 2N). Specifically, the exposure unit 60 included in the exposure apparatus 1C of the third embodiment is shared by the wafer stages 20A and 20B. Such a configuration may be employed in the first embodiment. The wafer processors (21 to 2N) may be wafer stages, chambers, or the like. Further, the wafer processors may be other tools or devices that perform processing, measurement, testing of wafers, and the like, such as reaction rooms, exposure systems, and alignment measurement systems.

In the first embodiment, each of the wafer processors (21 to 2N) may include multiple subordinate wafer processors. In this case, the subordinate wafer processors may perform processes in series. Additionally, the wafer processors (21 to 2N) may perform different processes. For example, when the exposure system uses different photomasks attached by means of mask options or the like, a process of forming a unique semiconductor device for each wafer is performed.

Further, the wafer processing apparatus 1 of the first embodiment may include additional processes before or after the parallel processes performed by the wafer processors. For example, photoresist application, development, thermal treatment, and the like may be performed before or after the parallel processes performed by the exposure processors. In this case, processors, which perform these additional processes, are incorporated between the wafer carrier (41, 42) and the wafer loader/unloader 30. If the wafer carrier 41 has an empty slot in which no wafer is housed, the controller 11 may control the corresponding processor not to perform a wafer process.

It has been explained in the second embodiment that the controller 11 obtains, from the storage 12, stage information for each wafer housed in a lot, and supplies a wafer to a wafer processor based on the stage information. However, the present invention is not limited thereto. Similar to the first and third embodiments, the controller 11 may supply wafers to respective wafer processors in a predetermined order, based on identification information of the wafer processor that processes the wafer in the slot SL1.

It has been explained in the second embodiment that the storage 12 stores stage information for each wafer. However, the storage 12 may store stage information for each slot. It has been explained in the second embodiment that lot identification information is detected by the sensor 51 (shown in FIG. 1) of the wafer processing apparatus 1A (or 1B). However, the lot identification information may be detected by a sensor (not shown) of the stocker 2A (or 2B).

It has been explained in the second embodiment that the controller 11 assigns, to the stocker 2A, a lot to be subjected to a wafer process on an empty stage of the wafer processing apparatus 1A, as the next lot. However, the present invention is not limited thereto. The controller 11 may assign the next lot based on the wafer processor identifier of the wafer processor (stage) that has processed the last supplied wafer. For example, according to the predetermined order of assigning stages, the controller 11 may assign, as the next lot, a lot to be subjected to the wafer process on the stage next to the stage on which the last supplied wafer has been processed. Alternatively, the controller 11 may assign the next lot to one of empty stages according to a predetermined order of assigning stages.

One embodiment of the exposure process performed by the exposure apparatus 1C has been explained in the third embodiment. However, various modifications may be made. For example, the present invention may be applied to a case where a pattern is formed by a double exposure process. The present invention may be applied to a case where formation of a first pattern, a freeze process, and formation of a second pattern to be combined with the first pattern are sequentially performed. The present invention may be applied to a manual alignment process with low precision. For example, the present invention may be applied to a case where a contact hole array is divided into two patterns.

It has been explained in each embodiment that each lot houses 25 pieces of wafers. However, the present invention is not limited thereto. A different number of wafers may be housed in each lot. It has been explained that the wafer carrier 40 shown in FIG. 2 houses the wafer 401 (appended the number #1) and the wafer 425 (appended the number #25) in the slot SL1 and the slot SL25, respectively. However, the order of housing wafers may be reversed. The order of wafers to be processed and the order of wafer processors that process wafers are not limited to the explained orders, and other orders may be used.

It has been explained in each embodiment that the controller 11 is provided outside the wafer processing apparatuses (1, 1A, 1B, and 1C). However, a controller may be included in each of the wafer processing apparatuses (1, 1A, 1B, and 1C) so that the processes of the controller 11 may be divided.

Each of the wafer processing systems 100, 100A, and 100B includes a computer system. Programs that make a computer to execute the methods of manufacturing a semiconductor device of the first to third embodiments are stored in a computer readable recoding medium. The aforementioned processes are performed by the computer reading and executing the program. The computer readable recording medium includes a magnetic disk, a magnetic optical disk, a CD-ROM, a DVD-ROM, a semiconductor memory, and the like. The computer program may be distributed to a computer through communication lines so that the computer executes the program.

In addition, while not specifically claimed in the claim section, the application reserves the right to include in the claim section at any appropriate time the following wafer processing systems.

A wafer processing system may include, but is not limited to: a first group of semiconductor wafers; a plurality of processors; a storage; and a supplier. The first group is allocated with a first group identifier. The first group of semiconductor wafers includes a first semiconductor wafer to be processed first among the first group. The plurality of processors process respective ones of the first group of semiconductor wafers. The plurality of processors includes a first processor to be used for processing the first semiconductor wafer. The storage stores a first relation between the first group identifier and the first processor. The supplier supplies the first semiconductor wafer to the first processor based on the first relation.

Another wafer processing system may include, but is not limited to: a first group of slots; a plurality of processors; a storage; and a supplier. The first group of semiconductor wafers are housed in respective ones of a first set of slots that are numbered. The first group is allocated with a first group identifier. The plurality of processors process respective ones of the first group of semiconductor wafers. The storage stores a first relation between the plurality of processors and respective ones of the slot numbers of the first set of slots. The first relation is related to the first group identifier. The supplier supplies the first group of semiconductor wafers to respective ones of the plurality of processors based on the first set identifier and the first relation.

Another wafer processing system may include, but is not limited to: a first set of processors; a second set of processors; a storage; and a controller. The first set of processors process respective ones of a first group of semiconductor wafers housed in a first set of slots that are numbered. The first group is allocated with a first group identifier. The second set of processors process respective ones of the first group of semiconductor wafers having been processed by the first set of processors. The storage stores a first relation between the second set of processors and respective ones of the slot numbers of the first set of slots. The first relation is related to the first group identifier. The controller supplies the first group of semiconductor wafers having been processed to respective ones of the second set of processors based on the first group identifier and the first relation.

What is claimed is:

1. A method of manufacturing a semiconductor device, comprising:
   obtaining a first group identifier allocated to a first group of semiconductor wafers, the first group of semiconductor wafers comprising a first semiconductor wafer and a second semiconductor wafer;
   determining, based on information related to the first group identifier stored by a storage, a first processor of a plurality of processors, the first processor being used for processing the first semiconductor wafer;
   supplying the first semiconductor wafer to the first processor, the first semiconductor wafer being supplied first among the first group; and
   supplying the second semiconductor wafer to a second processor of the plurality of processors, the second processor being other than the first processor, to thereby enable the first and second semiconductor wafers to be processed in parallel by the first and second processors, respectively.

2. The method according to claim 1, further comprising:
   supplying, in a predetermined order, each of the other semiconductor wafers of the first group of semiconductor wafers other than the first semiconductor wafer to a corresponding processor of the plurality of processors, the other semiconductor wafers including the second semiconductor wafer.

3. The method according to claim 2, further comprising:
   previously determining the corresponding processor of the plurality of processors to which each of the other semiconductor wafers of the first group of the semiconductor wafers other than the first semiconductor wafer is supplied.

4. The method according to claim 1, further comprising:
   previously storing a first relation between the first group identifier and the first processor in the storage.

5. The method according to claim 1, wherein
   each of the first group of semiconductor wafers is housed in a corresponding slot of a first set of slots, and
   the first set of slots are numbered.

6. The method according to claim 5,
   wherein the first semiconductor wafer is housed in a slot having a minimum slot number, and
   supplying the first semiconductor wafer comprises supplying, in ascending order of the slot numbers of the first set of slots, each of the other semiconductor wafers of the first group of semiconductor wafers to a corresponding processor of the plurality of processors.

7. The method according to claim 5, further comprising:
   after the first group of semiconductor wafers are processed by the plurality of processors, storing a second relation between the corresponding processors of the plurality of processors and the slot numbers of the first set of slots in which the first group of semiconductor wafers have been housed in the storage.

8. The method according to claim 5, further comprising:
   after each wafer of the first group of semiconductor wafers is processed by a corresponding processor of the plurality of processors, housing each wafer of the first group of semiconductor wafers in a corresponding slot of a second set of slots which have the same slot number as of the first set of slots in which the first group of semiconductor wafers are housed.

9. The method according to claim 1, wherein
   supplying the first semiconductor wafer comprises supplying the first semiconductor wafer to the first processor after processing a third semiconductor wafer included in a second group of semiconductor wafers last among the second group of semiconductor wafers, if the third semiconductor wafer is supplied to the first processor.

10. A method of manufacturing a semiconductor device, comprising:
    obtaining a first group identifier allocated to a first group of semiconductor wafers, the first group of semiconductor wafers being housed in slots that are numbered; and
    determining, based on information related to the first group identifier and stored in a storage, for each of the first group of semiconductor wafers, a corresponding processor of a plurality of processors for supplying each wafer to the corresponding processor, to thereby enable each of the first group of semiconductor wafers to be processed in parallel by the corresponding processor of the plurality of processors.

11. The method according to claim 10, further comprising:
    previously storing a first relation between the plurality of processors and slot numbers of a first set of slots in the storage, wherein the first relation is associated with the first group identifier in the storage.

12. The method according to claim 10, further comprising supplying the first group of semiconductor wafers in an ascending order of the slot numbers.

13. The method according to claim 10, wherein
    a second group of semiconductor wafers comprises a first semiconductor wafer to be supplied last among the second group to a corresponding processor of the plurality of processors,
    the first semiconductor wafer is housed in a first slot of a second set of slots,
    the first group of semiconductor wafers comprises a second semiconductor wafer to be supplied first among the first group to a corresponding processor of the plurality of processors,
    the second semiconductor wafer is housed in a second slot of a first set of slots,
    a first processor of the plurality of processors is determined to be used for processing the second semiconductor wafer,
    the first processor is used for processing the first semiconductor wafer, and the method further comprises:
    supplying the second semiconductor wafer to the first processor after the first semiconductor wafer is processed by the first processor.

14. A method of manufacturing a semiconductor device using a wafer processing system comprising a plurality of processors, the method comprising:
    processing a first semiconductor wafer in a first processor among a plurality of processors of the wafer processing system, the first semiconductor wafer being included in a first group of semiconductor wafers, and the first semiconductor wafer being supplied first among the first group of semiconductor wafers;
    storing, in a storage, a first identifier that identifies the first processor which has processed the first semiconductor wafer;
    determining the first processor for processing again the first semiconductor wafer, based on the first identifier; and processing a second semiconductor wafer in a second processor among the plurality of processors of the wafer processing system, the second semiconductor wafer being included in the first group of semiconductor wafers, wherein the first and second semiconductor wafers are processed in parallel to each other in the first and second processors respectively.

15. The method according to claim 14, further comprising:
supplying, in a predetermined order, each of the other semiconductor wafers of the first group of semiconductor wafers other than the first semiconductor wafer to a corresponding processor of the plurality of processors, the other semiconductor wafers including the second semiconductor wafer.

16. The method according to claim 14, further comprising:
previously storing the first identifier in association with the first group of semiconductor wafers in the storage.

17. The method according to claim 14, further comprising:
storing, in the storage, a second identifier that identifies the second processor which has processed the second semiconductor wafer; and
determining the second processor for processing again the second semiconductor wafer, based on the second identifier.

18. The method according to claim 14, wherein semiconductor wafers other than the first and second semiconductor wafers are processed alternately in processors other than the first and second processors.

\* \* \* \* \*